Feb. 19, 1952   O. M. WHITTEN ET AL   2,586,450
CONTROL DEVICE
Filed July 8, 1948   2 SHEETS—SHEET 1
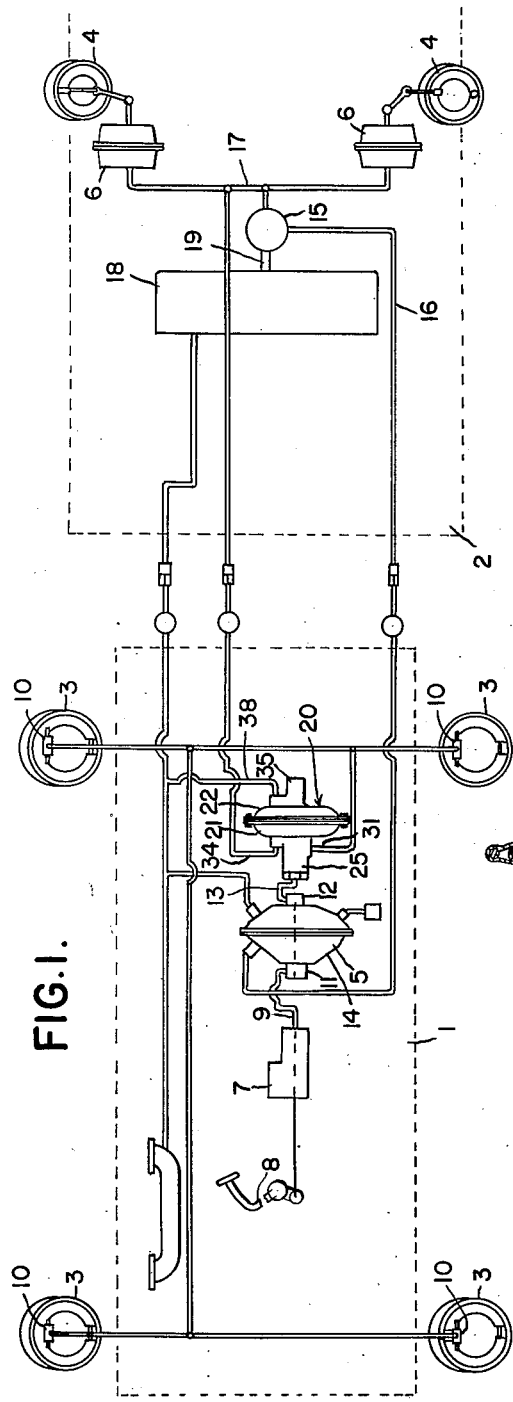
FIG.I.
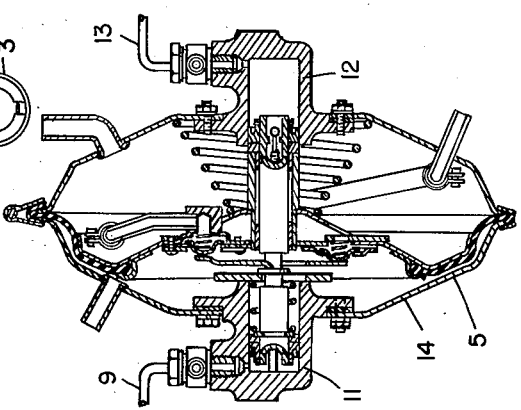
FIG.2.
INVENTORS
OWEN M. WHITTEN
BY RUPERT L. ATKIN
ATTORNEYS Feb. 19, 1952    O. M. WHITTEN ET AL    2,586,450
CONTROL DEVICE Filed July 8, 1948      2 SHEETS—SHEET 2

*INVENTORS*
OWEN M. WHITTEN
BY RUPERT L. ATKIN

ATTORNEYS

Patented Feb. 19, 1952

2,586,450

UNITED STATES PATENT OFFICE 2,586,450

CONTROL DEVICE

Owen M. Whitten and Rupert L. Atkin, Detroit, Mich., assignors to Kelsey-Hayes Wheel Company, Detroit, Mich., a corporation of Delaware Application July 8, 1948, Serial No. 37,668

11 Claims. (Cl. 188—3)

1

The invention relates to a control device for restraining power operation of a tractor power device when energized and thereby delaying the operation of a brake of the tractor and refers more particularly to a control device of this character which is designed especially for use in a power operated tractor and trailer brake system to restrain power operation of the tractor power device so that the tractor brake cannot be applied by its power device before the trailer brake is applied by its power device.

The invention has for one of its objects to provide an improved control device having a valve normally closing communication between two ports to prevent flow of brake fluid from one to the other and adapted to be operated by the brake fluid to open communication between the two ports.

The invention has for another object to provide an improved control device constructed to delay the opening movement of the valve.

The invention has for a further object to provide an improved control device in which the valve is normally operated by power mechanism and in the event that the power mechanism fails to function the brake fluid assures the operation of the valve.

With these and other objects in view, the invention further resides in the novel features of construction and combinations and arrangements of parts as more fully hereinafter set forth.

In the drawings:

Figure 1 is a diagrammatic view of a tractor and trailer brake system including a control device embodying the invention;

Figure 2 is an enlarged sectional view of the tractor power device;

Figure 3:
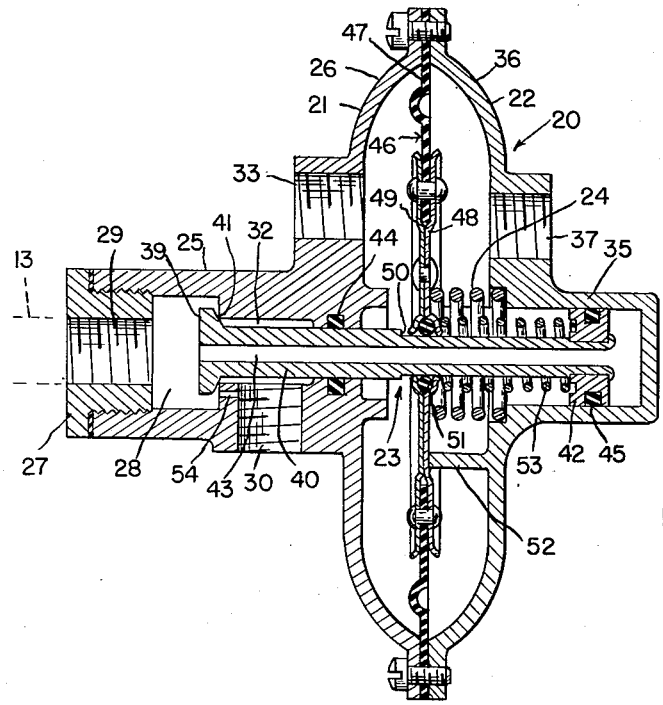
Figure 3 is an enlarged sectional view of the control device.

The control device is designed particularly for use in a tractor and trailer brake system having tractor and trailer power devices for applying the tractor and trailer brakes respectively and embodying a relay valve for controlling the energization of the trailer power device upon energization of the tractor power device. In general the system comprises the tractor 1 and the trailer 2 respectively having the wheel brakes 3 and 4 and the power devices 5 and 6 for operating the respective brakes 3 and 4. The conventional master cylinder 7 mounted on the tractor has its piston (not shown) connected to and operable by the conventional manually operable brake pedal

2

8 to displace, upon operation of the pedal, brake fluid into the conduit 9 which is connected to the tractor power device 5. The tractor brakes 3 are adapted to be applied by the wheel cylinders 10 of conventional design which are adapted to receive brake fluid displaced by the tractor power device.

The tractor power device is of the vacuum suspended type shown in the patent to R. J. Klimkiewicz, 2,377,699, issued June 5, 1945. This device has the axially aligned low and high pressure cylinders 11 and 12 respectively, the former being connected to the conduit 9 and the latter to the conduit 13. Power operable mechanism in the nature of a differential air pressure operated movable wall within the housing 14 between the cylinders is connected to an annular power plunger reciprocable within the high pressure cylinder. The movable wall is preferably a diaphragm. A control plunger reciprocable within the low pressure cylinder and the power plunger controls by means of vacuum and air valves the air pressure within the front variable pressure chamber, the rear wall of which is formed by the diaphragm. The rear chamber, the front wall of which is formed by the diaphragm is connected to a suitable source of vacuum which is preferably the intake manifold of the internal combustion engine of the tractor. The vacuum valve controls the communication between the rear chamber and the front variable pressure chamber while the air valve controls the communication between the air at atmospheric pressure and the front variable pressure chamber. The control plunger is formed with an axial bore which is open when the tractor power device is not in operation to compensate for expansion and contraction and loss of the brake fluid in the high pressure cylinder and the part of the system beyond and connecting into this cylinder.

The trailer brakes 4 are adapted to be applied by cams which are mechanically connected to the diaphragms of the trailer power devices 6. These devices are alike and of conventional design and are of the atmospheric suspended type there being one device for each trailer brake. The operation of the trailer power devices is controlled by the relay valve 15 of conventional design, the lower chamber of which is connected by the control conduit or line 16 to the front variable pressure chamber of the tractor power device 5. This relay valve also has chambers which are connected to the trailer power devices by the conduit or line 17 and to the vacuum tank 18 by the conduit or line 19 respectively. The relay valve is operated upon energization of the tractor power device 5 to first close the communication between the atmosphere and the conduit or line 17 and then open the communication between the vacuum tank 18 and the conduit or line 17.

The tractor and trailer brake system and particularly the tractor and trailer power devices and relay valve as above generally described are more fully shown and described in the patent application to Owen M. Whitten, Serial No. 1,760, filed January 12, 1948.

For the purpose of controlling the operation of the tractor power device so that it cannot apply the tractor brake before the trailer power devices have applied the trailer brakes, a control device 20 for restraining the tractor power device from power operation is provided. This control device is located on the tractor between the high pressure cylinder 12 of the tractor power device and the wheel cylinders 10. As shown particularly in Figure 3 the control device comprises a housing having the front and rear sections 21 and 22 respectively and the valve 23 and the power mechanism 24 within the housing.

The front housing section has the central integral boss 25 and the enlarged concave portion 26. The boss is threadedly engaged by the nut 27 which cooperates with the boss to form the recess in the front end of the boss into the chamber 28. The nut has the port 29 opening into the chamber and connected to the high pressure cylinder 12 of the tractor power device by the conduit 13. The boss has the transverse port 30 which is connected to the wheel cylinders 10 by the conduit 31 and which opens into the longitudinal passageway 32 formed in the boss in axial alignment with the chamber 28. This passageway opens into the chamber and is of smaller diameter. The enlarged concave portion 26 of the front housing section is provided with the port 33 which is connected to the conduit 34 leading to the conduit or line 17 between one of the trailer power devices 6 and the relay valve 15. The rear housing section has the central integral cylinder 35 in axial alignment with the longitudinal passageway 32 and the chamber 28, and having its rear or outer end closed, and the enlarged concave portion 36 which is provided with the port 37 connected by the conduit 38 to the intake manifold forming the source of vacuum for the system.

The valve 23 has the enlarged part or head 39 and the integral stem 40. The valve head is located within the chamber 28 and is engageable with the annular seat 41 at the junction between the chamber 28 and the longitudinal passageway 32. The valve stem extends axially through the passageway 32 and into the cylinder 35, an intermediate portion of the stem slidably engaging an axial bore in the front housing section 21. The valve stem is of smaller diameter than the passageway 32 providing for flow of the brake fluid through this passageway when the valve head is unseated or the valve is in open position.

For the purpose of moving the valve to open position, there is the movable wall 42 operatively connected to the valve. This movable wall is a piston slidably engaging the wall of the cylinder 35 and secured to the rear end of the valve stem 40. The valve is formed with the axial passageway 43 which places the chamber 28 in communication with the space in the cylinder 35 between its rear or outer closed end and the piston. The area of the face of the piston 42 exposed to the brake fluid is greater than the effective area of the face of the valve head 39 exposed to the brake fluid in the chamber 28.

A suitable sealing ring 44 in the front housing section 21 engages the valve stem 40 and a suitable sealing ring 45 in the piston 42 engages the wall of the cylinder 35.

The power mechanism 24 is a coil spring which is normally under compression and which, when released, is operable to move the valve to open position. For controlling the operation of the power mechanism differential air pressure operated means is provided. This means comprises the movable wall 46 in the nature of a diaphragm having the flexible outer portion 47 and the rigid central portion 48. The outer periphery of the flexible portion is clamped between the outer peripheries of the enlarged portions 21 and 22 of the housing sections and the inner periphery of the flexible portion is clamped between the outer peripheries of the plates 49 forming the central portion 48. The plates 49 are sleeved over a reduced portion of the valve stem 40 and the front plate is adapted to abut the annular shoulder 50 formed on the valve stem and to move the valve to open position under the action of the coil spring 24 which abuts the rear plate and the rear housing section. 51 is a sealing ring encircling the reduced portion of the valve stem and clamped between the plates 49.

The movable wall 46 is normally held in position with the rear plate 49 abutting the arcuate boss or lug 52 on the rear housing section by the differential of air pressure acting upon the movable wall, the chamber formed by the rear housing section and the movable wall being under subatmospheric pressure by reason of its being in communication with the source of vacuum and the chamber formed by the front housing section and the movable wall being under atmospheric pressure by reason of its being in communication with the conduit or line between one of the trailer power devices and the relay valve, this conduit or line being under atmospheric pressure as controlled by the relay valve.

To normally hold the valve in closed position with its head engaging the seat between the longitudinal passageway and chamber of the front housing section, there is the coil spring 53 abutting the rear plate of the movable wall 46 and the piston 42, the loading of this spring being comparatively light in the normal position of the parts with the valve closed.

To compensate for expansion and contraction of the brake fluid in the conduit 31 and the wheel cylinders 10, the boss 25 is provided with the restricted passageway 54 between the transverse port 30 and the chamber 28, the passageway being open at all times and having a much smaller cross sectional area than the axial passageway 43 so that only a relatively small amount of brake fluid can flow through the passageway 54 during the operation of the control device.

In operation, assuming the engine of the tractor to be running so that there is subatmospheric or vacuum pressure in both the intake manifold and the vacuum tank on the trailer, it will be seen that upon depressing the foot pedal 8 and operating the master cylinder 7, brake fluid under pressure is displaced into the low pressure cylinder 11 of the tractor power device 5. This displaced brake fluid moves the control plunger of the tractor power device rearwardly which operates the vacuum and air valves of the tractor power device to close the front variable pressure chamber of the tractor power device to the subatmospheric or vacuum pressure in the rear chamber and to then place the front variable pressure chamber in communication with the air under atmospheric pressure, after which the differential air pressure at the opposite sides of the movable wall of the tractor power device exerts a force tending to move the movable wall rearwardly and with it the power plunger. By reason of the valve of the control device 20 being in closed position, the movable wall and control plunger of the tractor power device are held from rearward movement. The air pressure in the front variable chamber of the tractor power device is transmitted through the relay line 16 to the relay valve 15 which operates to close the communication of the conduit 17 between the trailer power devices 16 and the relay valve 15 to air under atmospheric pressure and then place this conduit 17 in communication with the vacuum tank 18 to thereby operate the trailer power devices. The air pressure in this conduit 17 is transmitted through the conduit 34 to the front variable pressure chamber in the control device 20 and as the pressure lowers it eventually becomes such that the difference in pressure at the opposite sides of the movable wall 46 of the control device 20 is less than that exerted by the coil spring 24 so that the latter moves the movable wall and through this movable wall moves the valve assembly to open position with the valve head 39 clearing its seat 41, after which power operation of the tractor power device can take place to displace brake fluid into the chamber 28, the passageway 32 and the port 30 of the control device, the conduit 31 and finally the wheel cylinders 10, to operate the latter and apply the tractor brakes. Assuming the tractor brakes to be applied, brake fluid upon release of the tractor brakes by releasing the foot pedal 8 is forced back from the wheel cylinders 10 by the retracting springs of the tractor brakes through the conduit 31, the passageway 32, the chamber 28, the port 29, and the conduit 13 to the high pressure cylinder 12 of the tractor power device during which time the pressure of the brake fluid in the cylinder 35 decreases and the valve remains open. As soon as the pressure of the brakes in the passageway 32 has dropped to only slightly more than that in the chamber 28 and the pressure exerted by the spring 53 becomes greater than the difference in pressures of the brake fluid in the passageway 32 and chamber 28, the spring closes the valve and maintains a residual pressure in the conduit 31 and wheel cylinders 10 until sufficient brake fluid has flowed though the restricted passageway 54 from the conduit 31 into the chamber 28.

In the event that the movable wall of the control device fails to function for any reason to release the power spring 24 so that it can open the valve, the pressure of the brake fluid acting on the rear face of the piston 42 moves the valve to open position. In other words, the piston 42 actuated by the pressure of the brake fluid is a power means for moving the valve to open position independently of the power spring in the event that this power spring is not released by the differential pressure operated means. To secure this timing, the axial passageway 43 through the valve is restricted so that the opening movement of the valve due to the brake fluid pressure takes place after the opening movement of the valve by the power spring as controlled by the differential air pressure operated means when functioning properly.

Figure 4:
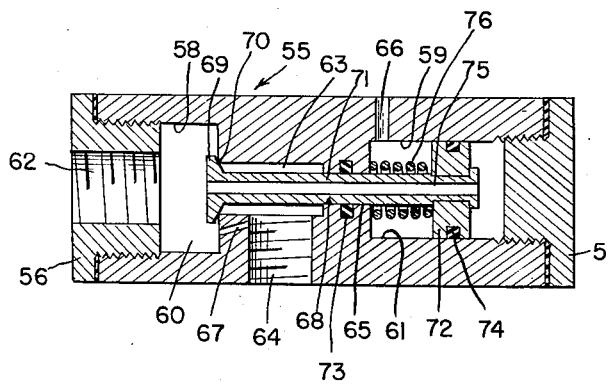
Figure 4 is a view similar to Figure 3 showing a modified construction of control device.

The modified construction of control device shown in Figure 4 is intended for use in the same tractor and trailer brake system but differs essentially from the control device 20 in having no extra power mechanism and differential air pressure operated means for controlling the operation of the power mechanism. The modified control device has the housing 55 in the nature of a cylinder having its front and rear ends threadedly engaged by the nuts 56 and 57 respectively. These nuts cooperate with the housing to form the recesses 58 and 59 in the front and rear ends of the housing into the chamber 60 and the cylinders 61 respectively. The nut 56 is provided with the axial port 62 in communication with the conduit leading from the high pressure cylinder of the tractor power device. The housing is also formed with the longitudinal passageway 63 leading from the chamber 60 and of smaller diameter and in axial alignment with this chamber and the cylinder 61. The housing is further formed with the transverse port 64 opening into the passageway 63 and connected to the wheel cylinders of the tractor and with the bearing portion 65 between the longitudinal passageway and the cylinder. In addition the housing is formed with the vent 66 placing the front end of the cylinder 61 in communication with the atmosphere and with the compensating passageway 67 between the transverse port 64 and the chamber 60. 68 is the valve assembly having the head 69 within the chamber 60 and engageable with the annular seat 70 between this chamber and the passageway 63. The valve assembly also has the valve stem 71 integral with the head and of smaller diameter than the passageway 63 and extending therethrough and into the cylinder 61 and having secured to its rear end the piston 72 which is slidable in the cylinder. An intermediate portion of the valve stem is slidable in the bearing 65 which is provided with the sealing ring 73. The piston 72 is also provided with the sealing ring 74 engaging the wall of the cylinder 61. The valve assembly further has the axial passageway 75 extending through the stem for placing the chamber 60 in communication with the portion of the cylinder 61 between the nut 57 and the piston 72. 76 is a coil spring for resiliently holding the valve in closed position, the coil spring encircling the valve stem and abutting the front or inner end of the cylinder 61 and the piston 72. The area of the piston exposed to the brake fluid is greater than the effective area of the valve head exposed to the brake fluid, and the axial passageway 75 is of a size and preferably restricted to delay the opening movement of the valve and restrain power operation of the tractor power device so that it cannot apply the tractor brakes before the trailer brakes have been applied by the trailer power devices. The operation of this control device in controlling the operation of the tractor power device and in maintaining a residual pressure in the wheel cylinders and connecting conduit for a time is the same as the operation of the control device 20 when the differential pressure operated means does not function.

What we claim as our invention is:

1. A control device for restraining power operation of a brake fluid containing tractor power device when energized comprising a housing having a pair of chambers in communication with each other, a port opening into one of said chambers for conducting brake fluid from the tractor power device to said last mentioned chamber and a second port for conducting brake fluid to a tractor brake actuator, a valve having a part movable within one of said chambers and subject to the pressure of the brake fluid in said last mentioned chamber and in closed position closing the communication between said last mentioned chamber and second port, spring means operatively connected to said valve to move the same to open position, differential air pressure operated means for controlling the operation of said spring means, and means operatively connected to said valve to move the same to open position independently of said spring means, said last mentioned means being within the other of said chambers and having an area greater than the effective area of said valve part.

2. A control device for restraining power operation of a brake fluid containing tractor power device when energized comprising a housing having a chamber, a port opening into said chamber for conducting brake fluid from the tractor power device to said chamber and a second port for conducting brake fluid to a tractor brake actuator, a valve normally closing communication between said chamber and second port, power mechanism for moving said valve to open position, differential pressure operated means for controlling the operation of said power mechanism, and means operable by the brake fluid for moving said valve to open position independently of said power mechanism.

3. In a tractor and trailer brake system, a power device operable by differential fluid pressure for operating a tractor brake, a power device operable by differential fluid pressure for operating a trailer brake, a relay valve for controlling operation of said trailer power device, fluid pressure transmitting lines between said tractor power device and relay valve and between said relay valve and trailer power device, a control device for restraining power operation of said tractor power device when energized having a passageway for the brake fluid from said tractor power device, a valve for said passageway, power mechanism for opening said valve and differential air pressure operated means for controlling the operation of said power mechanism, and means including a fluid pressure transmitting line between said control device and said line between said relay valve and trailer power device for progressively reducing the differential pressure of said control device whereby the latter exerts a progressively decreasing force becoming less than that of said power mechanism to permit opening of said valve by said power mechanism and subsequent power operation of said tractor power device.

4. A control device for restraining power operation of a tractor power device when energized comprising a housing section having a central boss provided with a chamber, a port opening into said chamber for conducting brake fluid from the tractor power device to said chamber, a longitudinal passageway of smaller diameter than and leading from said chamber and a second port opening into said passageway for conducting brake fluid to a tractor brake actuator, said housing section also having an enlarged concave portion provided with a port, a second housing section having a cylinder and an enlarged concave portion provided with a port, a valve having a head within said chamber adapted to close said passageway and a stem of smaller diameter than said passageway extending longitudinally therethrough and within said cylinder and provided with an axial passageway extending therethrough, a piston secured to said stem and slidable within said cylinder, a movable wall clamped between said enlarged portions of said housing sections and cooperating therewith to form chambers, said movable wall being operatively connected to said valve stem to open said valve, a spring for urging said valve toward closed position and a second spring for moving said movable wall to open said valve.

5. In a tractor and trailer brake system, a power device operable by differential fluid pressure for operating a tractor brake, a power device operable by differential fluid pressure for operating a trailer brake, a relay valve for controlling operation of said trailer power device, fluid pressure transmitting lines between said tractor power device and relay valve and between said relay valve and trailer power device, a control device for restraining power operation of said tractor power device when energized having a passageway for the brake fluid from said tractor power device, a valve for said passageway, power mechanism for opening said valve and differential air pressure operated means for controlling the operation of said power mechanism, means including a fluid pressure transmitting line between said control device and said line between said relay valve and trailer power device for progressively reducing the differential pressure of said control device whereby the latter exerts a progressively decreasing force becoming less than that of said power mechanism to permit opening of said valve by said power mechanism and subsequent power operation of said tractor power device, and means operable by the brake fluid within said control device for moving said valve to open position upon failure of said power mechanism.

6. In a tractor and trailer brake system, a power device for operating a tractor brake, a power device for operating a trailer brake, means controlled by said tractor power device for controlling operation of said trailer power device, and a control device for restraining power operation of said tractor power device when energized having a housing provided with a cylinder closed at one end, a chamber, a port opening into said chamber for conducting brake fluid from said tractor power device to said chamber, a passageway in axial alignment with said cylinder leading from said chamber, and a second port opening into said passageway for conducting brake fluid to a tractor brake actuator, a valve having a head movable within said chamber and in closed position closing the communication between said chamber and passageway and a stem extending longitudinally within said passageway and cylinder, and a piston on said stem reciprocable within said cylinder and having an area greater than the effective area of said head, said valve having a longitudinal passageway therethrough opening into the space between the closed end of said cylinder and said piston and into said chamber.

7. In a tractor and trailer brake system, a power device for operating a tractor brake, a power device for operating a trailer brake, means controlled by said tractor power device for controlling operation of said trailer power device, a control device for restraining power operation of said tractor power device when energized having a passageway for the brake fluid from said tractor power device, a valve for said passageway, power mechanism for opening said valve, and means controlled by said first mentioned means normally holding said valve closed and operable to permit opening of said valve by said power mechanism, and to thereby permit subsequent power operation of said tractor power device.

8. In a tractor and trailer brake system, a power device for operating a tractor brake, a power device for operating a trailer brake, means controlled by said tractor power device for controlling operation of said trailer power device, and a control device for restraining power operation of said tractor power device when energized having a housing provided with a cylinder closed at one end, a chamber, a port opening into said chamber for conducting brake fluid from said tractor power device to said chamber, a passageway leading from said chamber and a second port opening into said passageway for conducting brake fluid to a tractor brake actuator, a valve having a part subject to the pressure of the brake fluid in said chamber for closing the communication between said chamber and passageway and a piston connected to said valve and reciprocable within said cylinder and having an area greater than the effective area of said part, said chamber communicating with the space between the closed end of said cylinder and said reciprocable piston.

9. In a tractor and trailer brake system, a power device for operating a tractor brake, a power device for operating a trailer brake, a valve controlled by said tractor power device for controlling operation of said trailer power device, and a control device for restraining power operation of said tractor power device when energized having a housing member provided with a chamber, a port opening into said chamber for conducting brake fluid from said tractor power device to said chamber and a second port for conducting brake fluid to a tractor brake actuator, a valve member having a part for normally closing communication between said chamber and second port, and a member connected to said valve and having an area subject to the pressure of the brake fluid within said chamber greater than the effective area of said valve part and facing in the direction opposite to that of said valve part, one of said members having a passageway for conducting brake fluid from said chamber to contact said part of greater area.

10. In a tractor and trailer brake system, a power device for operating a tractor brake, a power device for operating a trailer brake, a valve controlled by said tractor power device for controlling operation of said trailer power device, and a control device for restaining power operation of said tractor power device when energized having a housing provided with a chamber, a port opening into said chamber for conducting brake fluid from said tractor power device to said chamber, and a second port for conducting brake fluid to a tractor brake actuator, a valve having a part for normally closing communication between said chamber and said second port and means operatively connected to said valve to open the same, said means having an area greater than the effective area of said valve part and facing in the direction opposite to that of said valve part and the opening movement of said valve, said means and valve part being exposed to brake fluid under pressure created by the brake fluid entering through said first mentioned port.

11. In a tractor and trailer brake system, a power device for operating a tractor brake, a power device for operating a trailer brake, means controlled by said tractor power device for controlling operation of said trailer power device, and a control device for restraining power operation of said tractor power device when energized having a housing provided with a pair of chambers in communication with each other, a port opening into one of said chambers for conducting brake fluid from said tractor power device to said last mentioned chamber and a second port for conducting brake fluid to a tractor brake actuator, a valve having a part movable within one of said chambers and in closed position closing the communication between said last mentioned chamber and second port, and a member movable within the other of said chambers and operatively connected to said first mentioned part to move the same to open position, said member having an area subject to the pressure of the brake fluid greater than the effective area of said valve part.

OWEN M. WHITTEN.
RUPERT L. ATKIN.

REFERENCES CITED

The following references are of record in the file of this patent:

UNITED STATES PATENTS

| Number | Name | Date |
|---|---|---|
| 42,430 | Boyle | Apr. 19, 1864 |
| 1,824,044 | Farmer | Sept. 22, 1931 |
| 2,150,021 | Christensen | Mar. 7, 1939 |
| 2,161,642 | Stroop | June 6, 1939 |
| 2,214,250 | Landrum | Sept. 10, 1940 |
| 2,275,255 | Freeman | Mar. 3, 1942 |
| 2,291,033 | Goepfrich | July 28, 1942 |
| 2,429,194 | Price | Oct. 14, 1947 |
| 2,463,172 | Gunderson | Mar. 1, 1949 |

FOREIGN PATENTS

| Number | Country | Date |
|---|---|---|
| 312,478 | Germany | May 27, 1919 |